April 10, 1962     S. B. RODMAN     3,029,390
VARIABLE WIDTH PULSE GENERATING MEANS
Filed Oct. 20, 1958     2 Sheets-Sheet 1
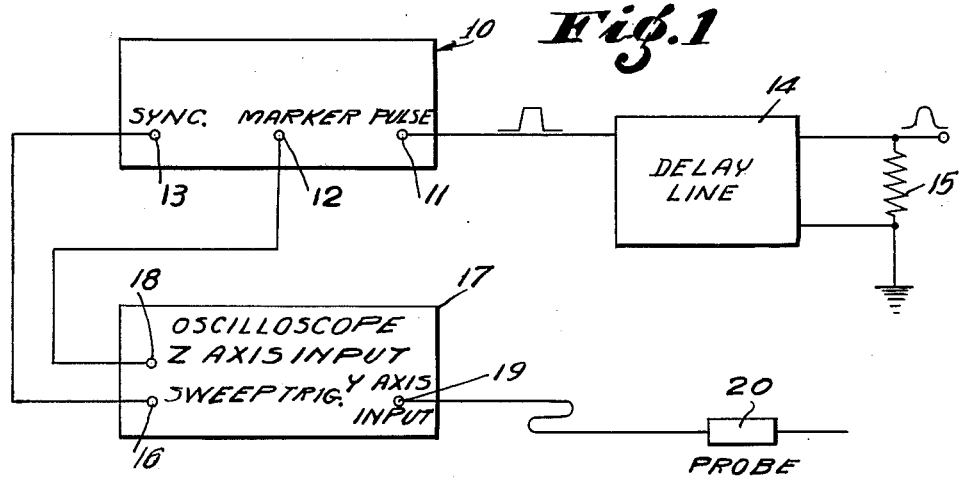
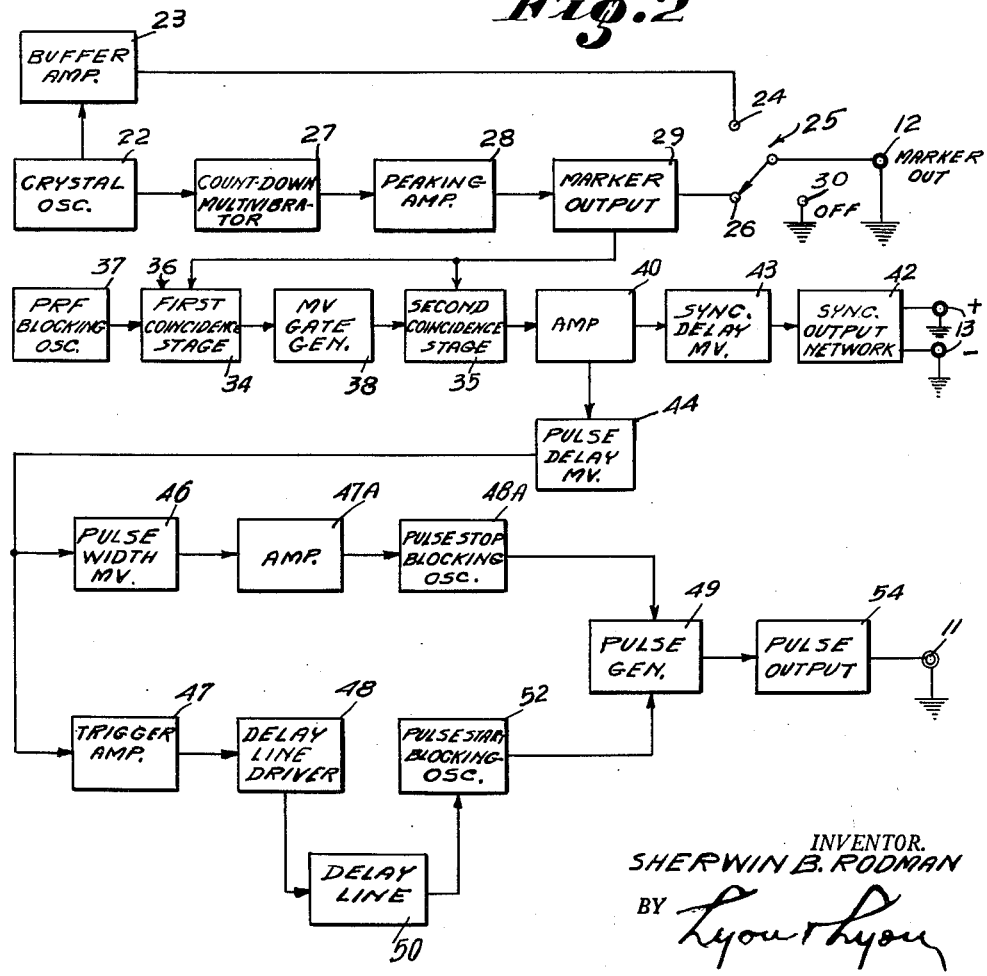
INVENTOR.
SHERWIN B. RODMAN
BY
ATTORNEYS

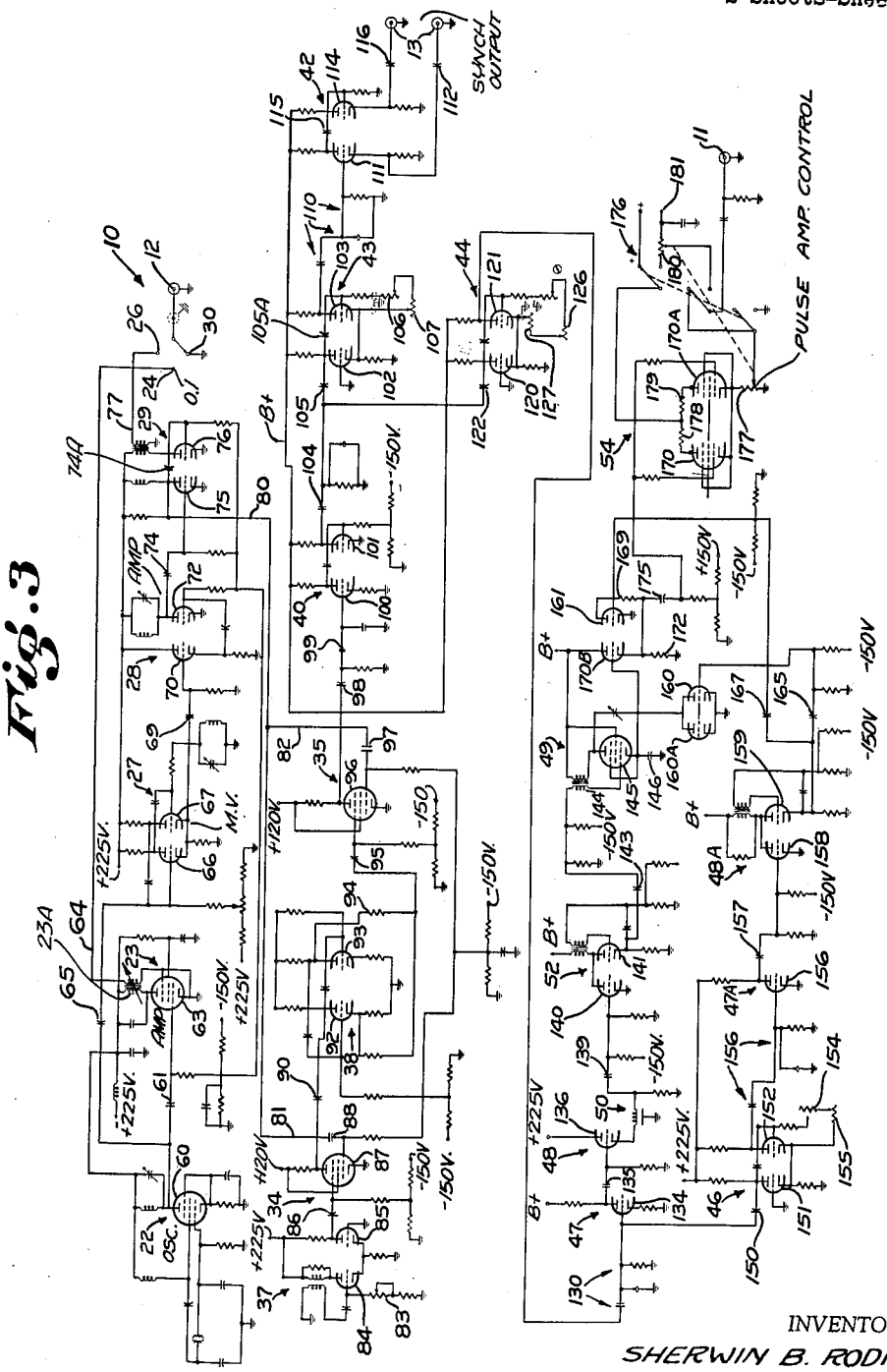

United States Patent Office 3,029,390
Patented Apr. 10, 1962

3,029,390
VARIABLE WIDTH PULSE GENERATING MEANS
Sherwin B. Rodman, Manhattan Beach, Calif., assignor to Telecomputing Corporation, a corporation of California
Filed Oct. 20, 1958, Ser. No. 768,468
2 Claims. (Cl. 328—55)

The present invention relates to improved means and techniques which are particularly useful in testing apparatus requiring the application thereto of pulses, for example, in the testing of delay lines.

The present invention is incorporated in a combined precision marker generator and pulse generator which are adapted to operate in conjunction with a cathode ray oscilloscope or scope. The generator outputs are locked together to provide completely jitter-free synchronization of output pulses, scope marker pulses and scope synchronizing pulses. The output pulses and the scope synchronizing pulses are variable with respect to each other as well as to the scope markers. Measurements of time delays in increments of as small at 0.01 microsecond are accomplished. Means are provided for control pulse amplitude, pulse width, sync delay and pulse rate in such a manner as to impart flexibility while yet maintaining synchronized operation.

A general object of the present invention is, therefore, to provide improved testing equipment incorporating features indicated above.

A specific object of the present invention is to provide improved means and techniques for accurately and conveniently measuring delay times, as, for example, the delay encountered in the transmission of a pulse through a delay line.

Another specific object of the present invention is to provide apparatus of this type in which the output pulse amplitude may be varied from zero to approximately 100 volts.

Another specific object of the present invention is to provide apparatus of this type in which the width of the output pulse may be varied between .1 and ten microseconds.

Another specific object of the present invention is to provide apparatus of this character in which the sync pulse delay is variable between —10 and +40 microseconds with respect to the output pulse.

Another specific object of the present invention is to provide apparatus of this type in which the delay of the pulse is accomplished using two adjustments, namely, a coarse adjustment which provides delays up to one microsecond and a vernier adjustment which provides delays over a .1 microsecond range.

Another specific object of the present invention is to provide apparatus of this type in which the output pulse repetition rate is variable from approximately 100 to 5000 pulses per second.

Another specific object of the present invention is to provide apparatus of this type in which either one-tenth of a microsecond or one microsecond marker is conveniently selectable.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings, in which:

FIGURE 1 illustrates in block diagram form a test set-up involving apparatus embodying features of the present invention in association with a cathode ray tube oscilloscope for measuring the delay encountered by a pulse in its transmission through a delay line.

FIGURE 2 is a block diagram of apparatus shown in FIGURE 1 and in more detail than FIGURE 3.

FIGURE 3 is a schematic diagram showing the circuitry included in block diagram form in FIGURE 2.

As shown in FIGURE 1, apparatus 10 embodying features of the present invention is adaptable to provide controlled output pulses on the output terminal 11, marker pulses on the terminal 12 and sync pulses on the terminal 13. The pulses on terminal 11 are applied to the input terminal of delay line 14 which is terminated by the resistance 15. The sync pulses developed on terminal 13 are applied to the sweep trigger terminal 16 of the cathode ray tube oscilloscope 17 for synchronizing the sweeps formed therein. The marker pulses developed on terminal 12 are applied to the Z axis input terminal 18 so that the same are rendered visible on the face of the cathode ray oscilloscope. The Y axis input terminal 19 of the scope 17 has connected thereto a conventional probe 20 which is connectible to different points on the delay lines, for test purposes.

FIGURE 2 shows in more detail an arrangement of elements in the device 10 shown in FIGURE 1.

With reference to FIGURE 2, the output of the crystal control oscillator 22 which develops sine waves having a frequency of ten megacycles is applied through the buffer amplifier 23 to a stationary terminal 24 of a single pole-three position switch 25 having its movable arm connected to the marker output terminal 12. A second stationary contact 26 of switch 25 has applied thereto a sine wave output having a frequency of one megacycle derived from the aforementionel crystal oscillator 22, using for that purpose a count-down multivibrator stage 27, tuned amplifier 28 and marker output circuit 29 which are connected in that order between the oscillator stage 22 and the terminal 26. A third stationary terminal 30 of switch 25 is grounded. With these means described above, markers having a spacing of one-tenth microsecond, or markers having a spacing of one microsecond, or no marker pulses, may be selected using switch 25.

The one microsecond markers appearing in the marker output circuit 29 are applied to a first coincidence stage 34 and a second coincidence stage 35 in the channel 36 which is controlled by the output of a blocking oscillator stage 37. Upon attainment of a coincident condition between the pulses developed in the blocking oscillator stage 37 and the one microsecond marker pulses, as determined in stage 34, a multivibrator gate generator 38 is controlled to initiate the gate. The gate developed in the generator 38 is applied to the second coincidence stage 35 with the one microsecond marker pulses; and the output of stage 35 is amplified in stage 40 and applied to the sync output network 42 through the sync delay multivibrator stage 43. The pulses amplified in stage 40 are applied to the pulse delay multivibrator stage 44 and the output thereof is applied to both a pulse width multivibrator stage 46 and a trigger amplifier stage 47. The output of multivibrator stage 46 is amplified in the amplifier stage 47A and then applied to the blocking oscillator stage 48A which has its output applied to the pulse generator stage 49.

The output of the trigger amplifier 47 is applied to a delay line driver which has its output connected to the delay line 50. The output of the delay line 50 is applied to the pulse starting blocking oscillator stage 52 having its output applied to the pulse generator stage 49. The pulse generator stage 49 supplies the pulses to the terminal 11 through the pulse output circuit 54.

The corresponding stages in FIGURES 1 and 2 have identical reference numerals.

With reference to FIGURE 3, the crystal oscillator 22 includes a tube, in conventional circuitry, for developing oscillations having a frequency of ten megacycles; and a signal having a frequency of ten megacycles is developed on the anode of tube 60 and applied through condenser 61 to the control grid of tube 63 in the buffer amplifier stage 23 which is a tuned amplifier. The variable transformer 23A in the anode circuit of tube 23 assures proper output with different impedances at output terminal 12. The output appears on lead 64 which is connected to the aforementioned output terminal 24.

A ten megacycle signal is also applied from the anode of tube 60 through condenser 65 to the control grid of tube 66 which is connected with tube 67 in conventional manner to provide the count-down multivibrator stage 27. The frequency is reduced by stage 27 by a factor of ten so that the signal appearing on the interconnected cathodes of tubes 66 and 67 and applied through coupling condenser 69 to the control grid of tube 70 has a frequency of one megacycle. Tube 70, a cathode follower isolates the multivibrator cutdown stage 27 from the tuned amplifier tube 72. The sine wave output appearing on the anode of tube 72 is applied through coupling condenser 74 to control grid of tube 75 which is a peaking amplifier. The peaked output appearing on the anode of tube 75 is applied through coupling condenser 74A to the control grid of tube 76 which is an output amplifier. One output of stage 29 appearing across the secondary of the transformer 77 is applied to the aforementioned terminal 26. A second output of stage 29 appears on the anode of tube 75 and is applied by lead 80 to the aforementioned coincidence stages 34 and 35 via leads 80, 81 and 82, respectively.

These coincidence stages 34 and 35, as mentioned previously with respect to FIGURE 2, are in a control channel which is fed with pulses developed in the blocking oscillator stage 37.

The blocking oscillator stage 37 is free running; but to provide jitter-free operation, its output is controlled by the aforementioned coincidence stages 34 and 35.

The blocking oscillator stage 37, using conventional circuitry, has its pulse repetition frequency (p.r.f.) adjustable in accordance with adjustment of the adjustable resistance 83. The pulse repetition frequency may be adjusted to provide pulses of a particular frequency in the range of 100 to 5000 cycles, with the pulse having a duration of at least one microsecond, and preferably a duration of two or three microseconds to assure coincident operation as contemplated. The output of the blocking oscillator stage 37 which comprises the tubes 84 and 85 is developed on the anode of tube 85 and applied therefrom through the condenser 86 to a control grid of tube 87 forming an element of the coincidence network 34. A second grid of tube 87 is connected to the aforementioned lead 81 through condenser 88. Upon achievement of a coincident condition between the blocking oscillator pulses and one of the one microsecond pulses, a negative signal is developed on the anode of tube 87 and applied through condenser 90 to the anode of tube 92 which is interconnected with tube 93 to provide the gate generator stage 38.

The multivibrator stage 38 develops a gate or pulse having a duration of at least one microsecond, and preferably two or three microseconds to assure achievement of a coincident condition in the second coincident stage 35 to which the output of the gate generator 38 is applied. Such output appearing on the anode of tube 93 is applied through resistance 94 and condenser 95 to a control grid of the coincidence tube 96, a second control grid of tube 96 being connected through condenser 97 to the aforementioned lead 82 for receiving one microsecond pulses. Upon attainment of a coincident condition, the negative signal is developed on the anode of tube 96 and applied through condenser 98 and diode 99 to the control grid of tube 100 which is interconnected with the tube 101 to provide the amplifier stage 40. A first amplified output of stage 40 is applied to the sync delay network 43 which includes tubes 102 and 103 connected in conventional manner to provide a multivibrator stage for producing gates or pulses of adjustable duration. More specifically, the amplified voltage appearing on the anode of tube 101 is applied through condensers 104 and 105 to the anode of tube 102 and through condenser 105A to the control grid of tube 103 for initiating the gate in stage 43. The duration of such gage is adjusted using the pair of serially connected resistances 106 and 107 which provide, respectively, a coarse and a fine adjustment of the gate duration. This duration is adjustable from −10 microseconds to +40 microseconds with reference to the output pulse which is developed on terminal 11 using the means which are described generally above and more specifically below.

The gate thus developed on the anode of tube 103 is differentiated by the differentiating network 110 to provide the pulse corresponding in time to such trailing edge, such pulse being applied to the control grid of the amplifying tube 111 forming a part of the sync output network 42. A voltage developed on the cathode of tube 111 is applied through condenser 112 to one of the sync output terminals 13. The other terminal 13 has also a sync pulse applied thereto but of opposite polarity because of phase reversal in the second amplifying tube 114 in the output circuit 42. Thus, the control grid of tube 114 is coupled to the anode of tube 111 by condenser 115 and the voltage developed on the cathode of tube 114 is applied through coupling condenser 116 to such other terminal 13.

Thus, the sync pulses which are developed on either one of the sync output terminals 13 may be adjusted not only in frequency but also in time of their appearance, the first adjustment being provided by the adjustable resistance 83 in the blocking oscillator stage 37, and the second adjustment being accomplished using the coarse and fine adjustable resistances 106 and 107 in the sync delay multivibrator stage 43. Such sync pulses are effectively locked in with the one microsecond pulses by use of the coincidence stages 36 and 35 in such a manner as to provide "jitter-free" sync pulses. The output pulses appearing on pulse output terminal 11 are also derived from the channel fed by the blocking oscillator stage 37 to assure a like jitter-free output pulse. For this purpose, the pulses applied to the pulse delay multivibrator stage 44 are also, as described in detail above, dependent upon a coincident condition between the one microsecond pulses and the pulses developed in the blocking oscillator stage 37.

With specific reference to FIGURE 3, the pulse delay multivibrator stage 44 includes a pair of tubes 120 and 121 with the anode of tube 120 being coupled by condenser 122 and the aforementioned condenser 104 to the anode of the amplifying tube 101; and, condenser 122A couples the anode of tube 120 to the control grid of tube 121. The multivibrator stage 44 is adjustable using the series connected resistances 126 and 127 so as to provide, respectively, a coarse and a fine adjustment of the duration of the gate developed by the multivibrator stage 44. The duration of the gate may be adjusted to provide a delay in the order of 1.2 microseconds so as to allow adjustment of a one microsecond marker or a one-tenth microsecond marker on any portion of the output pulse appearing at terminal 11. The output of the delay multivibrator stage 44 developed on the anode of tube 121 is applied to the differentiating network 130 which serves to differentiate the gate so as to provide a pulse which appears in time with the trailing edge, such pulse being applied to two different channels (including, respectively, stages 47 and 46) for initiating the development of a pulse and for terminating the duration of the pulse, using the means which are mentioned in detail hereinafter.

The pulse applied to the control grid of tube 134 which is a trigger amplifier is amplified in the stage 47 and after amplification, is applied through condenser 135 to the control grid of tube 136, tube 136 having the delay line 50 connected in its cathode circuit. The output terminal of the delay network 50 is coupled by condenser 139 to the control grid of tube 140 which is interconnected with tube 141 to provide the blocking oscillator stage 52. The pulse developed on the cathode of tube 141 is applied through condenser 143 and a winding of the blocking oscillator transformer 144 to the control grid of tube 145 which is connected in a modified blocking oscillator stage featured by the fact that a condenser 146 is connected between the cathode of tube 145 and ground without a shunting resistance. The tube 145 is thus functioned upon application of a pulse thereto from stage 52 to charge condenser 146 with a positive voltage, such positive voltage being allowed to be dissipated in accordance with a pulse developed in the pulse stopping channel which includes the stages 46, 47, 48 and 160, now described in detail.

The differentiated pulse supplied from the differentiating network 130 is applied also through coupling condenser 150 to the anode of tube 151 which is interconnected with tube 152 to provide an adjustable multivibrator stage 46. The duration of the gate which is developed by the multivibrator stage 46 in response to such input pulse is controlled by the series connected resistances 154 and 155 which provide, respectively, a coarse and a fine adjustment of the gate duration. This duration is adjustable from two to twelve microseconds. The trailing edge of the gate formed on the anode of tube 152 is differentiated by the differentiating network 156 to provide a pulse occurring in time with such trailing edge. This differentiating pulse is applied to the control grid of the amplifying tube 156 of amplifier stage 47A. The amplified pulse appearing on the anode of tube 156 is applied through condenser 157 to the control grid of tube 158 which is interconnected with tube 159 to provide the blocking oscillator stage 48A. Upon operation of the blocking oscillator stage 48A, a positive pulse is developed on the cathode of tube 159, and such pulse is applied to the control grid of two different tubes 160 and 161 which, in their quiescent state, are both non-conducting. Tube 160 is connected in parallel with tube 160A with their anodes connected to the cathode of tube 145 and their cathodes grounded. The grids of these two tubes 160 and 160A are coupled by condenser 165 to the cathode of tube 159, so that upon the appearance of the positive pulse on the cathode of tube 150, the tubes 160 and 160A are rendered conductive so as to provide a discharge path for the condenser 146 which is precharged earlier, as described above. The positive pulse appearing at cathode of tube 145 is direct coupled to control grid of cathode follower tube 170B. Tube 170B has in its cathode a high resistance 172 of, for example, 100,000 ohms. In order to insure that the trailing edge of the pulse appearing at the cathode of tube 170B decays rapidly, the auxiliary tube 161 is provided having its control grid coupled by condenser 167 to the cathode of blocking oscillator tube 159. The anode of tube 161 is connected through a low resistance 169 of, for example, 27 ohms to the cathode of tube 170B thereby shunting the cathode resistance 172. At the same time, tube 160 and 160A begin to conduct, tube 161 is rendered conductive which lowers the impedance at cathode of tube 170B, assuring rapid decay time. It is noted that the grid of tube 170 is connected to the cathode of tube 145 and this tube in its quiescent state is likewise non-conducting. It is, however, rendered conductive upon development of the pulse on the cathode of tube 159. The resulting discharge of condenser 146 through a relatively low resistance produces a pulse at the cathode of tube 170B which is coupled by condenser 175 to the control grids of the parallel connected cathode follower tubes 170, 170A forming part of the pulse output circuit 54. The resulting pulse appearing on the cathodes of tubes 170, 170A, in the position of the switching means 176, is applied to the pulse output terminal 11 and the amplitude of the pulse on output terminal 11 is adjusted by adjustment of the tap on the cathode resistance 177. If desired, the polarity of the output pulse may be reversed by operation of the switching means 176 to its other indicated position, in which case the pulse appears at the junction point of the anode resistances 178, 179, 180 and the amplitude of this pulse is adjusted by adjustment of the tap on the anode resistance 180.

Thus, the output pulse used generally for probing purposes, may have its amplitude adjusted using the adjustable resistance 177 or 180 and may have its time of occurrence adjusted by adjustment of the resistances 126 and 127, all of which adjustments are independent of the previously mentioned adjustments effecting the time of occurrence of the sync pulses. It is noted, however, that the pulse repetition rate adjustment involving the adjustable resistance 83 serves to jointly control the time of occurrence of the sync pulses that appear on terminal 13 and probing pulses that appear on terminal 11.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. Apparatus of the character described for developing markers, sync signals and pulses, a source of oscillations, a marker output terminal, a single pole-double throw switch having its movable contact connected to said market output terminal, said switch having a pair of stationary contacts, oscillation amplifying means coupled between one of said stationary terminals and said source, a countdown multivibrator, signal peaking means, said countdown multivibrator and said signal peaking means coupling said source to the other one of said pair of stationary terminals, an adjustable frequency blocking oscillator stage, a sync signal output terminal, a first multivibrator gate generator, first coincidence means coupling said blocking oscillator to said first gate generator, means coupling said peaking means to said first coincidence means, said first coincidence means being effective to initiate operation of said first gate generator upon simultaneous occurrence of a pulse from said blocking oscillator stage and a pulse from said peaking means, second coincidence means coupled to said peaking means and said first multivibrator gate generator, an adjustable sync delay multivibrator coupled between said sync signal, terminal and said second coincidence means, a pulse delay multivibrator coupled to the output of said second coincidence means, a pulse output terminal, pulse generating means coupled to said pulse output terminal, and adjustable delay means coupled between said pulse delay multivibrator and said pulse generating means.

2. Apparatus of the character described operating in conjunction with an oscilloscope having cathode beam intensity control means and cathode beam deflecting means, said apparatus comprising marker generating means forming a source of marker pulses, a marker output terminal coupled to said marker generating means and to said intensity control means, an adjustable source of pulses of substantially constant frequency, a sync signal output terminal coupled to said beam deflecting means, a channel connecting said source of adjustable pulses to said sync signal output terminal, said channel including coincidence means coupled to said source of marker pulses for rendering said channel effective to transmit pulses from said adjustable source of pulses to said sync output terminal and to deflect the cathode beam of the oscilloscope upon achievement of a coincident condition between said marker pulses and said pulses from said adjustable source of pulses to render said marker pulses visible on said oscilloscope, a pulse output terminal coupled to said beam deflecting means, a pulse generator connected to said terminal, and adjustable delay means responsive to the output of said coincidence means for initiating operation of said pulse generator.

References Cited in the file of this patent
UNITED STATES PATENTS

| | | |
|---|---|---|
| 2,562,450 | De Lano | July 31, 1951 |
| 2,671,896 | De Rosa | Mar. 9, 1954 |
| 2,688,077 | White et al. | Aug. 31, 1954 |
| 2,717,999 | Lewinstein | Sept. 13, 1955 |
| 2,755,414 | Snyder | July 17, 1956 |